United States Patent [19]
Remboski et al.

[11] Patent Number: 5,906,652
[45] Date of Patent: May 25, 1999

[54] METHOD AND SYSTEM FOR MISFIRE DETERMINATION USING SYNCHRONOUS CORRECTION

[75] Inventors: Donald Remboski, Dearborn; Darren Schumacher, Ypsilanti; Marvin Lynch, Detroit; Alan Chewter, Ann Arbor, all of Mich.

[73] Assignee: Motorola Inc., Schaumburg, Ill.

[21] Appl. No.: 09/126,871

[22] Filed: Jul. 31, 1998

[51] Int. Cl.[6] ................................................. G01M 15/00
[52] U.S. Cl. .......................... 701/110; 73/116; 73/117.3; 123/419; 123/436
[58] Field of Search ..................................... 701/110, 111; 123/419, 436; 73/116, 117.2, 117.3, 118.1

[56] References Cited

U.S. PATENT DOCUMENTS

| | | | |
|---|---|---|---|
| 5,216,915 | 6/1993 | Sakamoto | 73/117.3 |
| 5,263,365 | 11/1993 | Muller et al. | 73/117.3 |
| 5,307,671 | 5/1994 | Akase | 73/117.3 |
| 5,357,790 | 10/1994 | Hosoya | 73/117.3 |
| 5,361,629 | 11/1994 | McCombie | 73/117.3 |
| 5,485,374 | 1/1996 | Takaku | 701/110 |
| 5,539,644 | 7/1996 | Ichikawa et al. | 701/111 |
| 5,670,713 | 9/1997 | Machida et al. | 73/116 |
| 5,734,100 | 3/1998 | Kishimoto et al. | 73/117.3 |
| 5,819,197 | 10/1998 | Fiaschetti | 701/110 |

Primary Examiner—George Dombroske

[57] ABSTRACT

A method and system of misfire determination includes establishing an acceleration misfire threshold and an acceleration sub-misfire threshold. Then incremental engine position is sensed and a series of acceleration data-points are derived (401). If a data-point of the series of acceleration data-points falls between the sub-misfire threshold and the misfire threshold, then a training process is aborted for a blanking period based on a delay time whose length is preferably based on engine operating conditions (415). If a data-point of the series of acceleration data-points does not fall below the sub-misfire threshold, then the series of acceleration data-points, are averaged and a synchronously corrected acceleration data-point is derived (417). Then, a misfire condition is indicated when the synchronously corrected acceleration data-point exceeds the established acceleration misfire threshold (421).

18 Claims, 4 Drawing Sheets

METHOD AND SYSTEM FOR MISFIRE DETERMINATION USING SYNCHRONOUS CORRECTION

FIELD OF THE INVENTION

This invention is generally directed to the field of engine controls, and specifically to a signal processing apparatus and method for a reciprocating engine misfire detection system.

BACKGROUND OF THE INVENTION

Many contemporary reciprocating engine controls have integral misfire detection systems. With increasingly stringent emissions standards the assurance of accurate and complete misfire detection under all engine and vehicular operating conditions is becoming mandatory.

Commonly, system designers rely on measurement of crankshaft engine angular velocity, and sometimes crankshaft or other forms of, engine acceleration, both dependent largely on engine torque produced during a firing process, to determine misfiring of a particular engine cylinder. Typically, misfires are predicted by various signature analysis, and/or spectral analysis, methods that analyze the velocity or acceleration information measured.

Some contemporary engine misfire detection systems use position encoders affixed to an engine's crankshaft to determine rotary position of an engine. From this rotary position measurement, an engine speed and/or absolute position information can be derived. With this information the engine can be controlled in accordance with its mission, and combustion misfires can be detected through behavioral signature analysis as noted above. In operation such position encoders are subject to measurement inaccuracies as the engine rotates. These inaccuracies can lead to erroneous indications of true (physical) engine rotary position as the position encoder rotates. Moreover, because of crankshaft dynamics including: crankshaft torsional vibrations, inertial torque due to reciprocating masses, piston mass imbalance, and other mechanically induced vibrations on the engine's crankshaft, the engine rotary position data can effect the accuracy of misfire detection particularly at high engine speeds where these behaviors can largely swamp out any signatory behavior of a misfire event.

Some prior art misfire detection systems minimize position encoder errors by learning their behavior when the engine is not fueled, then subtract-out the learned behavior when the engine is fueled. The engine is defueled to prevent learning of misfire behavior—in case a misfire occurs during the learning process. If a misfire was learned during the learning process, then it would be subtracted out of the behavior and thus any misfires may not be reliably detected. Besides requiring off-line calibration, these schemes do not correct for mechanically induced vibrations on the engine's crankshaft in a fueled condition, nor do they account for changing engine operation with aging.

Another problem with high accuracy prior art misfire determination systems is data rate, or the rate at which the engine's positional data must be analyzed for misfire, and the impact on computational resources to support this high accuracy. In a typical prior art misfire detection system, the system's main microcontroller, or other hardwired circuit, is often charged with analyzing misfire behavior. As misfire detection over all operating conditions becomes required, a greater burden is shared by the main microcontroller in completing this task. This becomes particularly difficult at high engine speeds because the main microcontroller must forfeit much of its resources to service the misfire detection strategy.

What is needed is an improved signal processing approach for misfire detection, particularly one that is less resource intensive and more accurate, particularly at high engine speeds, and adaptive to changing engine conditions over the life of the engine.

DESCRIPTION OF THE PREFERRED EMBODIMENTS

A method and system of misfire determination includes establishing an acceleration misfire threshold and an acceleration sub-misfire threshold. Then incremental engine position is sensed and a series of acceleration data-points are derived. If a data-point of the series of acceleration data-points falls between the sub-misfire threshold and the misfire threshold, then a training process is aborted for a blanking period based on a delay time whose length is preferably based on engine operating conditions. If a data-point of the series of acceleration data-points does not fall below the sub-misfire threshold, then the series of acceleration data-points are averaged and a synchronously corrected acceleration data-point is derived dependent thereon. Then, a misfire condition is indicated when the synchronously corrected acceleration data-point, exceeds (falls below) the established acceleration misfire threshold.

As a practical matter the key to compensating for engine crankshaft dynamics, including crankshaft torsional vibrations, inertial torque due to reciprocating masses, piston mass imbalance, and other mechanically induced vibrations on the engine's crankshaft, is to remove the dynamic pattern in acceleration which occurs during engine operation. The dynamic pattern in acceleration must be learned for each engine as it operates, then it is subtracted or otherwise removed during an adaptation process and the typically-smaller misfire signals become much easier to detect using a misfire detector when they occur.

It is vital to not learn the dynamic pattern in acceleration when the engine is indeed misfiring, because the misfire behavior will then also be removed from the dynamic pattern in acceleration, and the misfire detector will become deaf to the presence of misfire.

If it were practical to accurately anticipate a priori when a misfire will occur in a fueled engine, then the learning process could be gated by this anticipation. In the present embodiment, a measurement is made that signals the likelihood that a misfire may be about to occur and the learning process is gated off. This is accomplished by setting a sub-misfire threshold. When the engine's acceleration behavior crosses this sub-misfire threshold misfire-like behavior is anticipated and the learning process is aborted, or disabled for a period. This adaptation-disable period is variable and is preferably based on both an engine calibration exercise as well as measured engine, powertrain, and/or vehicle operating conditions.

The sub-misfire threshold may also be variable and determined based on both an engine calibration exercise as well as measured engine, powertrain, and/or vehicle operating conditions.

In the preferred embodiment, incremental engine position is sensed and a series of acceleration data-points is derived therefrom. Once the engine's acceleration data is gathered, it is further processed in order to identify periodic behavioral patterns that potentially mask any true misfire behavior. As long as any instantaneous acceleration data-point from the one of the series of acceleration data-points has a magnitude remaining above the sub-misfire threshold, that acceleration data-point will be used in the periodic behavioral pattern identification process. One such process is ensemble averaging. A mathematical representation of an ensemble average, or a synchronous correction factor is given by:

$$sc_j = \frac{\left(\sum_{i=1}^{n} \alpha_i\right)}{n}$$

Where:
sc$_j$ is an ensemble average (or synchronous correction factor) for cylinder j;
$\alpha_i$ is an acceleration data-point taken from the one of the series of acceleration data-points,
i is a sample index running from one to a number of samples taken n for cylinder j; and
n is a calibratable parameter.

So, if n is equal to eight, then eight successive acceleration data-points $\alpha_i$ from cylinder j are averaged. If no misfire is present, which is a precondition of the periodic behavioral pattern identification process, the acceleration data-points measured represent normal combustion behavior and general system noise. This normal combustion behavior and general system noise is then removed from a next-measured, or current, acceleration data-point for cylinder j. So, once the ensemble average, or correction factor, sc$_j$ is computed, it can be subtracted from the currently acquired acceleration value from cylinder j to form a synchronously corrected acceleration value absent the identified periodic behavioral pattern.

$$\alpha_{sc} = \alpha_i - sc_j$$

Where:
$\alpha_{sc}$ is the synchronously corrected acceleration.

Note that the he synchronously corrected acceleration is determined for each cylinder. Alternative periodic behavioral pattern identification approaches can be used as well. For example, a fraction of the presently-acquired acceleration value is added to a previously-acquired acceleration value.

$$\alpha_{SC} = \frac{\alpha_i}{n} + \alpha_{(i-1)}$$

Where:
$\alpha_{(i-1)}$ is the prior acceleration measurement for the same cylinder j for the same combustion event; and
n is a calibratable parameter.

Of course, this method requires that the signals be zero mean in order to converge to the correct value.

The various synchronous correction equation(s) operate on singular acceleration data-points captured from successive firings of the same cylinder. An ensemble average is an average for each cylinder, and the acceleration signals are preferably decimated down to the firing rate, if at all possible. Each data-point is indexed according to cylinder and averages/factors are only calculated from data corresponding to a single cylinder.

Another approach is to add a fraction of the difference between the currently acquired acceleration value and a previously-acquired acceleration value to the previously acquired acceleration value.

$$\alpha_{SC} = \frac{\alpha_i - \alpha_{(i-1)}}{n} + \alpha_{(i-1)}$$

Where:
$\alpha_{(i-1)}$ is another acceleration measurement for the same cylinder j for a previous combustion event; and
n is a constant defined by the user.

Those skilled in the art will be able to realize other periodic behavioral pattern identification approaches that are within the spirit of this teaching.

As a practical matter, by observing data from a range of vehicles, a pattern in the synchronous correction factor as a function of engine speed and engine load becomes apparent.

Moreover, the synchronous correction factor will vary from engine to engine, for a specific vehicle type. Next, the preferred embodiment will be described.

Figure 1:
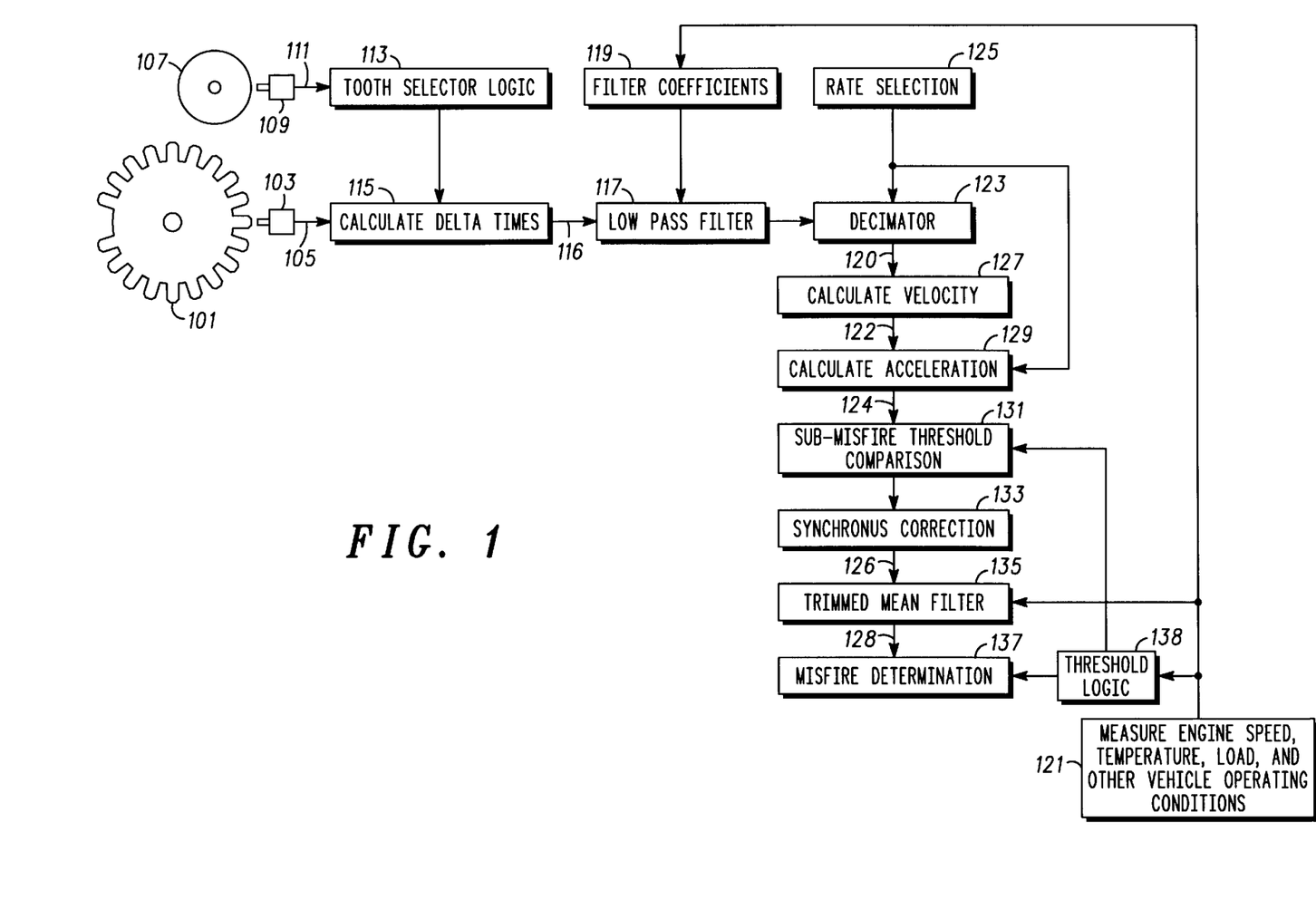
FIG. 1 is a block diagram of a misfire detection system using synchronous correction in accordance with a preferred embodiment of the invention.

FIG. 1 is a block diagram of a misfire detection system using synchronous correction in accordance with the preferred embodiment of the invention. The misfire detection system shown here is coupled to a reciprocating engine. A multi-toothed wheel 101 is coupled to a crankshaft of the engine, and a single-toothed wheel 107 is coupled to a camshaft of the engine. A sensor 103, preferably a variable reluctance type sensor, senses motion of the multi-toothed wheel 101 and produces an incremental engine position signal 105, essentially a series of time-spaced pulses. Another sensor 109, again preferably a variable reluctance type sensor, senses motion of the single-toothed wheel 107 and produces an absolute engine position signal 111. Tooth selector logic 113 is used to choose which tooth crossing signals 105 provided by sensor 103 are used to calculate engine crankshaft acceleration. In effect, tooth selector logic 113 decimates the output of sensor 105 to the highest even sample period which removes any encoder missing teeth on multi-toothed wheel 101. Block 115 calculates a series of time differences 116 between each of the series of time-spaced pulses as the multi-toothed wheel 101 rotates. Effectively elements 101, 103, 107, 109, 113, and 115 measure engine rotary position. The series of time differences 116 is passed to a lowpass filter 117, which creates a series of lowpass-filtered time differences 118. While the engine is operating, various sensors 121 measure engine speed, temperature, load, and other vehicle operating conditions. Operation of the lowpass filter 117 is governed by filter coefficients 119, that are derived dependent on the measured engine and vehicle operating conditions 121 as well as engine performance profiles developed in a calibration, or powertrain mapping process.

Next, a decimator 123 decimates the lowpass-filtered time differences 118 and provides a series of selected time differences 120. Which time differences, of the lowpass-filtered time differences 118, are selected depends on the number of time differences required for misfire detection. In the preferred embodiment, the decimator 123 decimates the lowpass-filtered time differences 118 to the firing rate of the engine (i.e. to one event per cylinder). Decimation rate selection 125 depends on the firing rate of the engine, and is indexed to absolute engine position via the tooth selector logic 113. Decimating the lowpass-filtered time differences 118 here, before post-processing that follows is very advantageous because the amount of data which needs to be post-processed is greatly reduced compared to the prior art wherein decimation was not performed until after post-processing (reference Remboski et al).

Then, in block 127 a velocity of each of the series of selected time differences 120 is calculated based on the series of selected time differences 120, and a series of velocity data-points 122 is provided dependent thereon.

Next, in block 129 an acceleration of each of series of velocity data-points 122 is calculated by differentiating the series of velocity data-points 122, and a series of acceleration data-points 124 is provided dependent thereon.

The change in calculated velocity is calculated by subtracting the previous velocity from the current velocity. We then multiply by the crank rate divided by a conversion factor dependent on units. This result is then multiplied by the current velocity to get acceleration.

Then, in blocks 131 and 133, the series of acceleration data-points 124 is compared to an acceleration sub-misfire threshold, which may optionally be based on a measured engine or vehicle operating condition, and a synchronously corrected acceleration data-point 126 is provided, when each of the series of acceleration data-points have a magnitude greater than the acceleration sub-misfire threshold. Note that while the text refers to only one series of acceleration data-points the system and method actually operate on a series for each cylinder in a multi-cylinder engine implementation. Mechanisms associated with the multi-toothed wheel 101 and the single-toothed wheel 107 keep track of each of the series.

Figure 2:
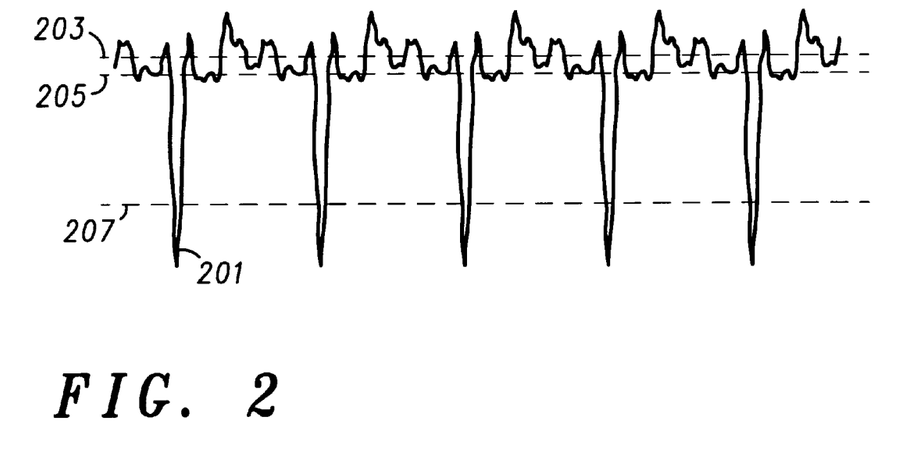
FIG. 2 is chart showing a waveform and thresholds used in the embodiments described herein.

Operation can be illustrated with the aid of FIG. 2, which shows a continuous waveform 201 consisting of the series of acceleration data-points 124. Reference number 205 shows the acceleration sub-misfire threshold, reference number 203 shows an averaged acceleration line with the dc component removed, and reference number 207 indicates a misfire threshold. Note that when a misfire occurs the mass of the engine components causes a deceleration behavior in the crankshaft, and thus the negative-going behavior of the waveform 201.

Next, the synchronously corrected acceleration data-point 126 is filtered using a trimmed-mean filter 135. Note that a median or other statistical-type filter may also be substituted for the trimmed-mean filter. The trimmed-mean filter 135 provides a filtered signal 128 dependent on the synchronously corrected acceleration data-point 126. This filtering action is desirable in some applications because it reduces or completely removes the effects of road-load and driver induced disturbances on the acceleration trace. Road-load and driver induced disturbances might otherwise shift the position of the acceleration data-points 126 relative to the misfire threshold 207. Note that the trimmed-mean filter 135 is operated in accordance with measured engine and vehicle operating conditions as well as engine performance profiles developed in a calibration, or powertrain mapping process. Alternatively, the trimmed-mean filter 135 can be place ahead of the synchronous correction block 133.

Then, a misfire determination device 137 indicates a misfire condition when a synchronously corrected acceleration data-point, or the filtered signal 128, falls below the established acceleration misfire threshold 207. Note that the misfire determination device 137 is operated in accordance with measured engine and vehicle operating conditions as well as engine performance profiles developed in a calibration, or powertrain mapping process, and the misfire and sub-misfire thresholds are provided by element 138.

Figure 3:
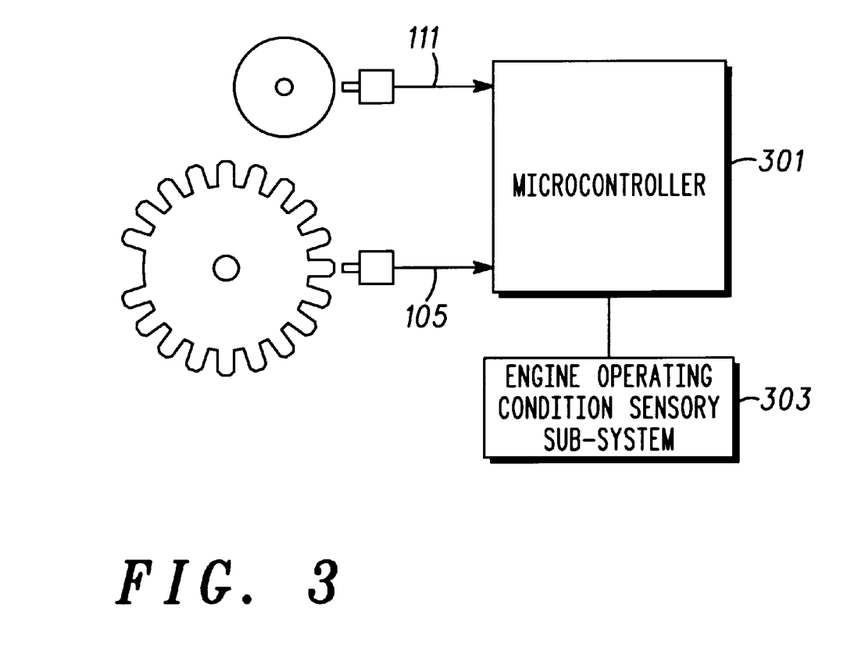
FIG. 3 is a system block diagram supportive of a method embodiment of the invention.

Next a method embodiment will be detailed. FIG. 3 is a system block diagram supportive of a method embodiment, and includes a microcontroller 301 for interpreting the absolute engine position signal 111, and the incremental engine position signal 105 provided by the sensors described earlier. Motorola Inc. makes a suitable microcontroller 301, but other microcontrollers can be used as well. Alternatively, the method could be executed on a digital signal processor or DSP. For instance a Motorola DSP56001 device may be used. The microcontroller 301 is programmed with code in accordance with the flowchart shown in FIG. 4. An engine operating condition sensory sub-system 303, in cooperation with sensors 103 and 109 measures engine operating conditions such as engine speed, engine load, and engine temperature. Of course other engine and powertrain operating conditions may be measured and applied.

Figure 4:
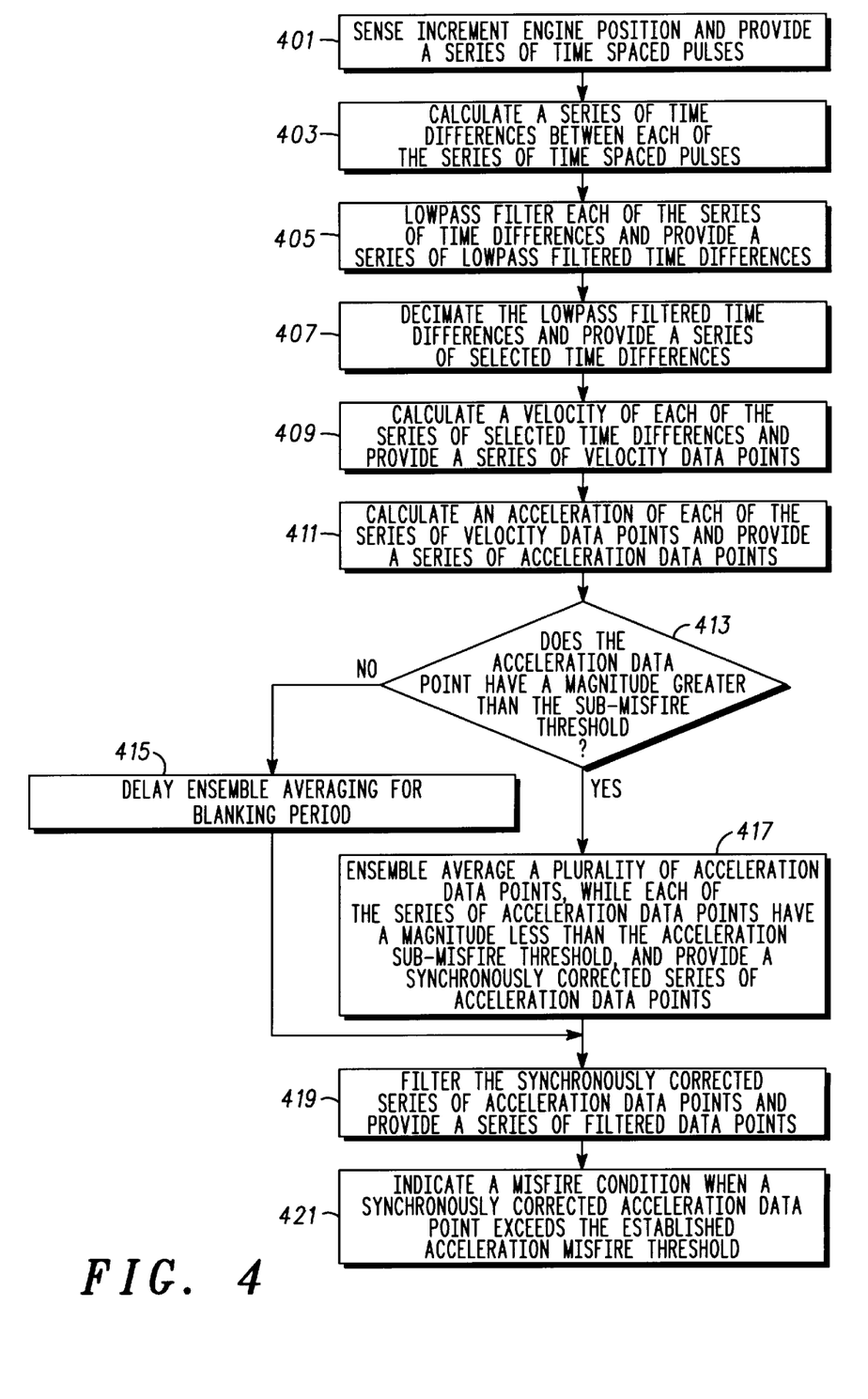
FIG. 4 a flow chart illustrating a method embodiment of the invention.

The method commences at step 401 in FIG. 4. In step 401 incremental engine position is sensed, and a series of time-spaced pulses is provided based on the rotation of the toothed wheel 101.

Next, in step 403, a series of time differences between each of the series of time-spaced pulses is calculated.

Then, each of the series of time differences is lowpass filtered and a series of lowpass-filtered time differences is derived in step 405. Preferably, as in the system embodiment, the lowpass filtering is influenced by various engine and vehicular operating conditions.

Next, in step 407, the lowpass-filtered time differences are decimated, and a series of selected time differences is provided therefrom.

In step 409 a velocity of each of the series of selected time differences is calculated and a series of velocity data-points is thereby provided.

Then, in step 411 a derivative of each of the series of velocity data-points is calculated, and a series of acceleration data-points is derived.

In decision step 413, each acceleration data-point is tested to see whether or not is has a magnitude greater than the sub-misfire threshold 205. If an acceleration data-point has a magnitude less than the sub-misfire threshold 205, then a misfire, or other significant disturbance may be occurring and ensemble averaging of related acceleration data-points is aborted, or delayed for a blanking period as shown in step 415. Note that the blanking period is preferably determined in part based on various engine and vehicular operating conditions.

If an acceleration data-point has a magnitude greater than the sub-misfire threshold 205, then the acceleration data-point is ensemble averaged with related acceleration data-points, and synchronous correction is executed as shown in step 417 providing a synchronously corrected acceleration data-point.

Next, in step 419 the synchronously corrected acceleration data-point is filtered, and a series of filtered data-points is derived therefrom. Note that preferably the filter is a statistical-type filter such as a trimmed-mean, or median-type filter, that is operated in accordance with various engine and vehicular operating conditions.

In step 421 a misfire condition is indicated when a filtered data-point falls below the established acceleration misfire threshold.

Figure 5:
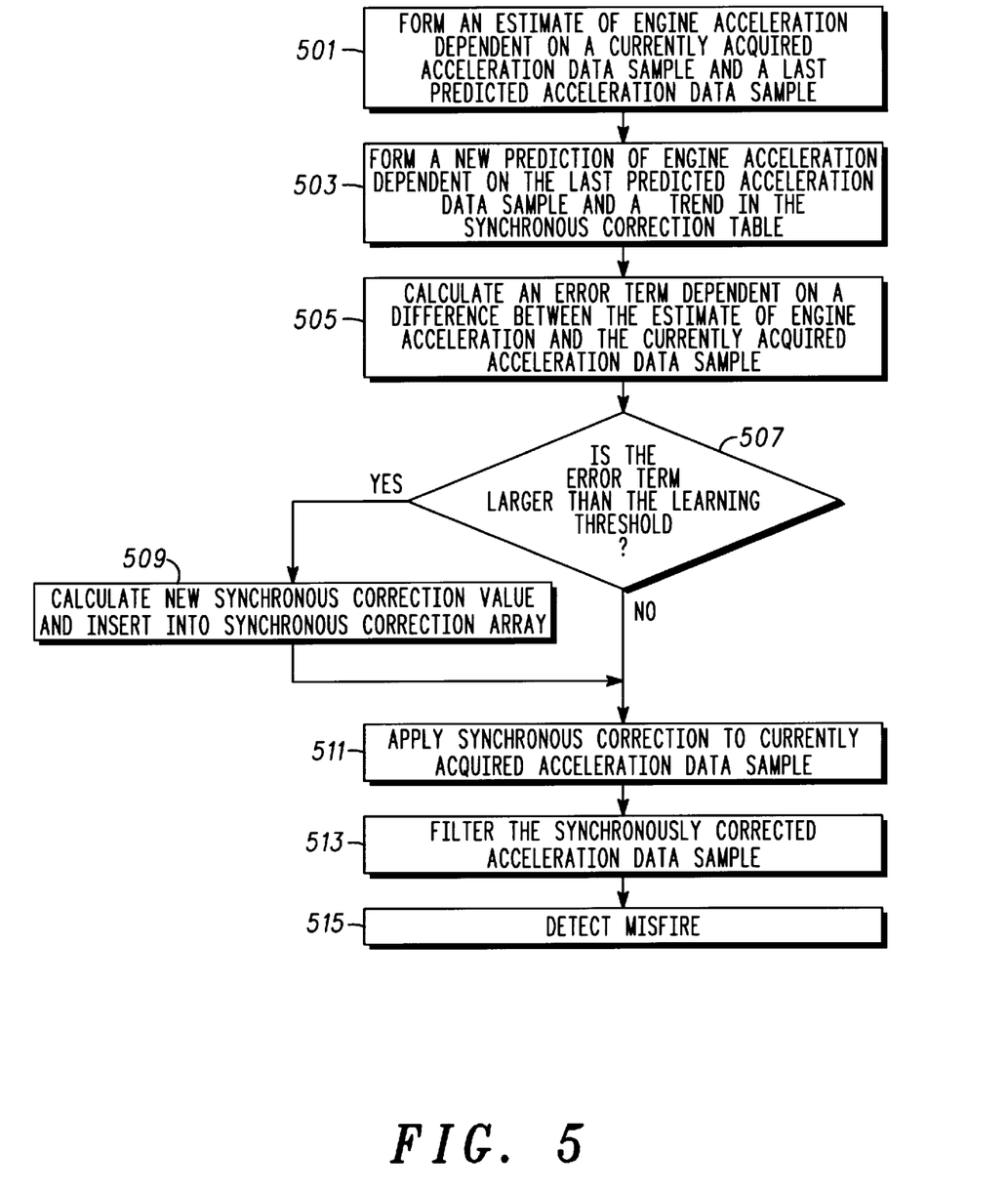
FIG. 5 illustrates an alternative embodiment for synchronous correction of engine acceleration data, and subsequent misfire detection.

FIG. 5 illustrates an alternative embodiment for synchronous correction of engine acceleration data, and subsequent misfire detection. This alternative embodiment relies on learning or adaptation based on a propagation or slew-limit type approach. The flow chart of FIG. 5 is encoded into the microcontroller 301 shown in FIG. 3 for execution. The microcontroller 301 includes a memory array, or table, that holds an array of historical synchronous correction factors. The array capacity is variable and ranges from a capacity corresponding to an entry per engine position of interest (at least one per cylinder—but can be more for certain engine families), up to a capacity to handle multiple engine cycles.

In step 501 an estimate of engine acceleration is formed dependent on a currently-acquired acceleration data sample and a last-predicted acceleration data sample, both associated with the present engine rotational position, using the following equation:

$$\alpha_{e(i)} = \frac{\alpha_{c(i)} + \alpha_{p(i-n)}}{x}$$

Where:
i is a sample index running from one to a number of samples taken n. for a particular cylinder;
$\alpha_{e(i)}$ is the newly estimated acceleration;
$\alpha_{c(i)}$ is the most currently-acquired acceleration data-point taken from the one of the series of acceleration data-points;
$\alpha p(i-n)$ is the acceleration predicted for the same ith sample index in the last engine revolution; and
x is a calibratible normalization factor, and is chosen such that the trade-off between prediction sensitivity and signal noise is optimized.

Next, in step 503 a new prediction of engine acceleration is formed dependent on the currently-acquired acceleration data sample and a trend in the synchronous correction factor array, using the following equation:

$$\alpha_{p(i)} = \alpha_{e(i)} + sc(i+1) - sc(i)$$

Where:
$\alpha_{p(i)}$ is the newly predicted acceleration;
sc(i) is the synchronous correction factor retrieved from the synchronous correction factor array associated with positional sample i; and
sc(i+1) is the synchronous correction factor retrieved from the synchronous correction factor array associated with sample index i+1.

Then, in step 505 an error term is calculated based on the newly estimated acceleration and the most currently acquired acceleration using the following equation:

$$\alpha_{error(i)} = \alpha_{e(i)} - \alpha_{c(i)}$$

Where:
$\alpha_{error(i)}$ is the error term.

For relatively-small amplitude periodic behavior the error term will be small, and ideally zero. For relatively-large amplitude behavior (either periodic or aperiodic), the error term will be large.

Next, in step 507 $\alpha_{error(i)}$ is compared to a calibratible learning or adaptation threshold—effectively the sub-misfire threshold described earlier. If $\alpha_{error(i)}$ is larger than the learning threshold, then the synchronous correction factor array entry associated with the presently positioned measurement will not be updated and the method will branch to step 511. Note that $\alpha_{error(i)}$ will be large if the measured acceleration behavior is aperiodic or substantially differs from most of the periodic acceleration behavior i.e. variance is high compared to a measure of standard deviation of the acceleration data. If the error term is large, it may signify a misfire. This step alone can be used in some cases for direct misfire detection without further signal processing.

If $\alpha_{error(i)}$ is smaller than the learning threshold, then the synchronous correction factor array entry associated with the presently positioned measurement will be updated as shown in step 509. Essentially, the test in step 507 determines whether or not it is safe to learn the measured behavior.

Then, in step 511 synchronous correction is applied to the currently-acquired acceleration data sample by subtracting the synchronous correction factor in the synchronous correction factor array from the currently-acquired acceleration data sample corresponding to the current engine position.

$$\alpha_{sc(i)} = \alpha_{c(i)} - sc(i)$$

Where:
$\alpha_{sc(i)}$ is the synchronously corrected acceleration data sample.

Next, in step 513, the synchronously corrected acceleration data sample $\alpha_{sc(i)}$ is filtered via a statistical filter. Then, in step 515 misfire detection is performed.

This embodiment is particularly interesting because there are actually two separate misfire-type behavior determinations, one at step 507 and one at step 515.

In conclusion, an improved signal processing approach in both a system and method embodiments have been illustrated for a misfire detection system that is less resource intensive and more accurate than other known approaches, particularly at high engine speeds. Resources are optimized because the acceleration data is decimated which action reduces the resource requirement on the post processing structure. Furthermore, the above-detailed approach is adaptive to changing engine conditions over the life of the engine because synchronous correction runs continuously as the engine runs.

What is claimed is:

1. A method of misfire determination in a reciprocating engine, the method comprising the steps of:
    establishing an acceleration misfire threshold;
    establishing an acceleration sub-misfire threshold representing a fraction of the established acceleration misfire threshold;
    sensing incremental engine position and providing a series of acceleration data-points dependent thereon;
    averaging the series of acceleration data-points, when each of the series of acceleration data-points have a magnitude greater than the acceleration sub-misfire threshold, and providing a synchronous correction factor dependent thereon;
    providing a synchronously corrected acceleration data-point dependent on one of the series of acceleration data-points and the synchronous correction factor; and
    indicating a misfire condition when the synchronously corrected acceleration data-point exceeds the established acceleration misfire threshold.

2. A method in accordance with claim 1 wherein the step of averaging comprises a step of averaging the series of acceleration data-points, when each of the series of acceleration data-points have a magnitude greater than the acceleration sub-misfire threshold and providing a synchronous correction factor dependent on the following deterministic equation:

$$sc_j = \frac{\left(\sum_{i=1}^{n} a_i\right)}{n}$$

Where:
scj is a synchronous correction factor for cylinder j;
ai is an acceleration data-point taken from the one of the series of acceleration data-points; and
i is a sample index running from one to a number of samples taken n. for cylinder j.

3. A method in accordance with claim 2 wherein the step of providing a synchronously corrected acceleration data-point comprises a step of subtracting the synchronous correction factor from the one of the series of acceleration data-points.

4. A method in accordance with claim 2 further comprising a step of:
measuring at least one engine operating condition selected from a group consisting of engine speed, engine load, and engine temperature; and
wherein n is determined dependent on the at least one measured engine operating condition.

5. A method in accordance with claim 1 further comprising a step of:
skipping the step of averaging the series of acceleration data-points, when one of the series of acceleration data-points exceeds the sub-misfire threshold.

6. A method in accordance with claim 5 wherein the step of skipping is executed for a blanking period.

7. A method in accordance with claim 6 further comprising a step of:
measuring at least one engine operating condition selected from a group consisting of engine speed, engine load, and engine temperature; and
wherein the blanking period is determined dependent on the at least one measured engine operating condition.

8. A method in accordance with claim 1 further comprising the step of:
establishing a slew limit dependent on a standard deviation of the series of acceleration data-points; and
wherein the step of providing a synchronously corrected acceleration data-point is executed when the series of acceleration data-points is bounded within the slew limit.

9. A method of engine misfire determination comprising the steps of:
establishing an acceleration misfire threshold;
establishing an acceleration sub-misfire threshold representing a fraction of the established acceleration misfire threshold;
sensing incremental engine position and providing a series of lowpass-filtered time differences associated with a cylinder of the engine;
decimating the series of lowpass-filtered time differences and providing a series of selected time differences;
calculating acceleration of the series of selected time differences and providing a series of acceleration data-points dependent thereon;
averaging the series of acceleration data-points when each of the series of acceleration data-points have a magnitude greater than the acceleration sub-misfire threshold and providing a synchronous correction factor dependent thereon;
providing a synchronously corrected acceleration data-point dependent on one of the series of acceleration data-points and the synchronous correction factor; and
indicating a misfire condition when a synchronously corrected acceleration data-point exceeds the established acceleration misfire threshold.

10. A method in accordance with claim 9 wherein the step of averaging comprises a step of averaging the series of acceleration data-points, when each of the series of acceleration data-points have a magnitude greater than the acceleration sub-misfire threshold and providing a synchronous correction factor dependent on the following deterministic equation:

$$sc_j = \frac{\left(\sum_{i=1}^{n} a_i\right)}{n}$$

Where:
scj is a synchronous correction factor for cylinder j;
ai is an acceleration data-point taken from the one of the series of acceleration data-points; and
i is a sample index running from one to a number of samples taken n. for cylinder j.

11. A method in accordance with claim 10 wherein the step of providing a synchronously corrected acceleration data-point comprises a step of subtracting the synchronous correction factor from the one of the series of acceleration data-points.

12. A method in accordance with claim 11 further comprising a step of:
measuring engine operating conditions; and
wherein n is determined dependent on the at least one measured engine operating condition.

13. A method in accordance with claim 12 further comprising a step of:
skipping the step of averaging the series of acceleration data-points, when one of the series of acceleration data-points exceeds the sub-misfire threshold.

14. A method in accordance with claim 13 wherein the step of skipping is executed for a blanking period.

15. A method in accordance with claim 14 further comprising a step of:
measuring engine operating conditions; and
wherein the blanking period is determined dependent on measured engine operating conditions.

16. A method in accordance with claim 9 further comprising the step of:
establishing a slew limit dependent on a standard deviation of the series of acceleration data-points; and
wherein the step of providing a synchronously corrected acceleration data-point is executed when the series of acceleration data-points is bounded within the slew limit.

17. A system of misfire determination in a reciprocating engine comprising:
a device for establishing an acceleration misfire threshold and an acceleration sub-misfire threshold representing a fraction of the established acceleration misfire threshold;
a device for measuring engine rotary position and providing a series of time differences;
a lowpass filter for filtering the series of time differences and providing a series of lowpass-filtered time differences dependent thereon;

a decimator for decimating the series of lowpass-filtered time differences and providing a series of selected time differences;

a device for calculating acceleration of the series of selected time differences and providing a series of acceleration data-points dependent thereon;

a synchronous corrector for averaging the series of acceleration data-points when each of the series of acceleration data-points have a magnitude greater than the acceleration sub-misfire threshold and providing a synchronous correction factor dependent thereon, wherein the synchronous corrector further provides a synchronously corrected acceleration data-point dependent on one of the series of acceleration data-points and the synchronous correction factor; and a misfire indicator for posting a misfire condition when a synchronously corrected acceleration data-point exceeds the established acceleration misfire threshold.

18. A system in accordance with claim 17 further comprising a device for measuring at least one engine operating condition selected from a group consisting of engine speed, engine load, and engine temperature, and wherein the device for establishing an acceleration misfire threshold and an acceleration sub-misfire threshold determines the acceleration misfire threshold and an acceleration sub-misfire threshold dependent on the at least one measured engine operating condition.

* * * * *